United States Patent
Sawhney (10) Patent No.: US 10,956,051 B2
(45) Date of Patent: Mar. 23, 2021

(54) DATA-PACKED STORAGE CONTAINERS FOR STREAMLINED ACCESS AND MIGRATION

(71) Applicant: Oracle International Corporation, Redwood Shores, CA (US)

(72) Inventor: Aditya Sawhney, Erie, CO (US)

(73) Assignee: Oracle International Corporation, Redwood Shores (CA)

( * ) Notice: Subject to any disclaimer, the term of this patent is extended or adjusted under 35 U.S.C. 154(b) by 413 days.

(21) Appl. No.: 15/339,313

(22) Filed: Oct. 31, 2016

(65) Prior Publication Data
US 2018/0121110 A1 May 3, 2018

(51) Int. Cl.
*G06F 3/06* (2006.01)

(52) U.S. Cl.
CPC ............ *G06F 3/0619* (2013.01); *G06F 3/067* (2013.01); *G06F 3/0647* (2013.01); *G06F 3/0685* (2013.01)

(58) Field of Classification Search
CPC ...... G06F 3/0619; G06F 3/0647; G06F 3/067; G06F 3/0685
USPC ......................................................... 707/804
See application file for complete search history.

(56) References Cited

U.S. PATENT DOCUMENTS

| | | | |
|---|---|---|---|
| 5,544,347 A | 8/1996 | Yanai et al. | |
| 5,657,453 A | 8/1997 | Taoka et al. | |
| 6,108,748 A | 8/2000 | Ofek et al. | |
| 6,157,612 A | 12/2000 | Weerackody et al. | |
| 6,460,052 B1 | 10/2002 | Thomas et al. | |
| 6,714,553 B1 | 3/2004 | Poole et al. | |
| 7,035,971 B1 | 4/2006 | Merchant | |
| 7,245,624 B2 | 7/2007 | Kramer et al. | |
| 7,263,593 B2 | 8/2007 | Honda et al. | |
| 7,707,151 B1 | 4/2010 | Blumenau et al. | |
| 8,484,162 B2 | 7/2013 | Prahlad et al. | |
| 8,521,973 B2 | 8/2013 | Rowan et al. | |
| 8,627,319 B1 | 1/2014 | Xu | |
| 8,645,737 B2 * | 2/2014 | Saika .................... G06F 1/3203 713/324 |
| 8,973,034 B1 | 3/2015 | Harvey et al. | |

(Continued)

FOREIGN PATENT DOCUMENTS

JP 3208236 B2 9/2001
KR 10-2015-0088531 A 8/2015

OTHER PUBLICATIONS

Silberschatz et al. "Operating System Concepts, 8th Edition". John Wiley & Sons. Jul. 29, 2008. ISBN-13: 978-0-470-12872-5. Accessed Aug. 2019. (Year: 2008).

*Primary Examiner* — Alicia M Antoine
(74) *Attorney, Agent, or Firm* — Invoke (57) ABSTRACT

Techniques are described for organizing data within a storage system. In one or more embodiments, a storage system monitors access to a first set of objects comprising (a) a first subset of objects associated with at least a first attributes and (b) a second subset of objects associated with at least a second attribute. Based on the monitoring, the storage system identifies a pattern of accessing objects in the second subset of objects subsequent to accessing objects in the first subset of objects. Responsive to receiving a request to store a second set of objects, the storage system generates a file in which a first object associated with at least the first attribute and a second object associated with at least the second object are stored consecutively.

18 Claims, 7 Drawing Sheets

(56) References Cited

U.S. PATENT DOCUMENTS

| | | | |
|---|---|---|---|
| 9,037,538 B2 | 5/2015 | Sampathkumar | |
| 9,396,287 B1 | 7/2016 | Bhave et al. | |
| 9,501,507 B1 | 11/2016 | Harris et al. | |
| 9,507,818 B1 | 11/2016 | Stefani et al. | |
| 9,507,843 B1 | 11/2016 | Madhavarapu et al. | |
| 9,524,302 B2 | 12/2016 | Regni et al. | |
| 9,547,459 B1* | 1/2017 | BenHanokh | G06F 3/0689 |
| 9,720,989 B2 | 8/2017 | Theimer et al. | |
| 9,740,565 B1* | 8/2017 | Mitra | G06F 16/113 |
| 9,798,754 B1* | 10/2017 | Shilane | G06F 12/0862 |
| 9,811,529 B1* | 11/2017 | Rus | G06F 3/067 |
| 9,846,655 B1* | 12/2017 | Zhao | G06F 13/14 |
| 9,864,774 B2 | 1/2018 | Marcotte | |
| 10,229,150 B2 | 3/2019 | Marquardt et al. | |
| 10,346,360 B1* | 7/2019 | Basov | G06F 3/0611 |
| 2001/0016843 A1 | 8/2001 | Olson et al. | |
| 2002/0143494 A1 | 10/2002 | Conrad | |
| 2004/0153458 A1 | 8/2004 | Noble et al. | |
| 2005/0049945 A1 | 3/2005 | Bourbonnais et al. | |
| 2005/0131964 A1 | 6/2005 | Saxena | |
| 2006/0072400 A1 | 4/2006 | Anderson et al. | |
| 2006/0095481 A1 | 5/2006 | Singh et al. | |
| 2006/0106825 A1 | 5/2006 | Cozzi | |
| 2006/0218558 A1 | 9/2006 | Torii et al. | |
| 2006/0271420 A1 | 11/2006 | Anselmann et al. | |
| 2007/0043790 A1 | 2/2007 | Kryger | |
| 2007/0192229 A1 | 8/2007 | Rowan | |
| 2007/0239944 A1 | 10/2007 | Rupanagunta et al. | |
| 2009/0059017 A1 | 3/2009 | Kurokawa | |
| 2010/0049938 A1 | 2/2010 | Izumi et al. | |
| 2010/0205160 A1 | 8/2010 | Kumar et al. | |
| 2010/0257995 A1 | 10/2010 | Kamiya | |
| 2010/0322475 A1 | 12/2010 | Ikeda | |
| 2011/0013631 A1 | 1/2011 | Frydman et al. | |
| 2011/0016353 A1 | 1/2011 | Mikesell et al. | |
| 2011/0119100 A1 | 5/2011 | Ruhl et al. | |
| 2011/0164614 A1 | 7/2011 | Begeja | |
| 2011/0196900 A1 | 8/2011 | Drobychev et al. | |
| 2011/0246429 A1 | 10/2011 | Prahlad et al. | |
| 2011/0298520 A1 | 12/2011 | Masson | |
| 2012/0072412 A1 | 3/2012 | Bestgen et al. | |
| 2012/0191724 A1 | 7/2012 | Tucek et al. | |
| 2012/0204007 A1 | 8/2012 | Reid | |
| 2012/0254116 A1 | 10/2012 | Thereska et al. | |
| 2012/0259863 A1 | 10/2012 | Bodwin et al. | |
| 2012/0311586 A1 | 12/2012 | Inagaki | |
| 2013/0290249 A1 | 10/2013 | Merriman et al. | |
| 2013/0311422 A1 | 11/2013 | Walker et al. | |
| 2013/0311555 A1 | 11/2013 | Laoutaris et al. | |
| 2013/0326055 A1 | 12/2013 | Chatterjee et al. | |
| 2014/0040199 A1 | 2/2014 | Golab et al. | |
| 2014/0122022 A1 | 5/2014 | Chen et al. | |
| 2014/0180461 A1 | 6/2014 | Heck et al. | |
| 2014/0188868 A1* | 7/2014 | Hunter | G06F 3/06 707/736 |
| 2014/0189270 A1 | 7/2014 | Iwanicki et al. | |
| 2014/0207820 A1 | 7/2014 | Lee | |
| 2014/0250281 A1* | 9/2014 | Rao | G06F 12/0223 711/156 |
| 2014/0280986 A1 | 9/2014 | Baulier et al. | |
| 2015/0088940 A1* | 3/2015 | Stokely | G06F 3/0617 707/827 |
| 2015/0112836 A1 | 4/2015 | Godsey et al. | |
| 2015/0172412 A1 | 6/2015 | Escriva et al. | |
| 2015/0220558 A1 | 8/2015 | Snibbe et al. | |
| 2015/0234897 A1 | 8/2015 | Kuninobu et al. | |
| 2015/0278092 A1 | 10/2015 | Smentek et al. | |
| 2015/0302432 A1 | 10/2015 | Chien et al. | |
| 2015/0339314 A1 | 11/2015 | Collins et al. | |
| 2015/0355824 A1 | 12/2015 | Ueno | |
| 2015/0363271 A1 | 12/2015 | Haustein et al. | |
| 2015/0370505 A1 | 12/2015 | Shuma et al. | |
| 2016/0006673 A1 | 1/2016 | Thomas et al. | |
| 2016/0026409 A1 | 1/2016 | Tanaka et al. | |
| 2016/0105370 A1 | 4/2016 | Mellor et al. | |
| 2016/0202693 A1 | 7/2016 | Noda et al. | |
| 2016/0255139 A1 | 9/2016 | Rathod | |
| 2016/0275150 A1 | 9/2016 | Bournonnais et al. | |
| 2016/0306822 A1 | 10/2016 | Waghulde | |
| 2016/0335550 A1 | 11/2016 | Achin et al. | |
| 2016/0342486 A1 | 11/2016 | Kedem et al. | |
| 2017/0052717 A1 | 2/2017 | Rawat et al. | |
| 2017/0351543 A1 | 12/2017 | Kimura | |
| 2017/0371887 A1 | 12/2017 | Balasubramanian et al. | |
| 2018/0004560 A1* | 1/2018 | Shankar | G06F 9/4856 |
| 2018/0075069 A1 | 3/2018 | Guim et al. | |

\* cited by examiner

DATA-PACKED STORAGE CONTAINERS FOR STREAMLINED ACCESS AND MIGRATION

TECHNICAL FIELD

The present disclosure relates to storing objects in a storage system. In particular, the present disclosure relates to bin-packing data objects into storage containers based on access patterns and object attributes.

BACKGROUND

Storage systems store objects according to various corresponding storage architectures. Examples of storage architectures include an object storage, a file system, a block storage, and/or a database.

Each object within a storage system is associated with data and metadata. Data (also referred to herein as "object data") includes, for example, information that is used by an end user and/or a client application. As an example, data for a Sales Application may include information about customers, products, and sales. As another example, data for a Human Resources Application may include information about employees, departments, and salaries. Metadata describes how the data is set up and/or stored. Additionally or alternatively, metadata describes characteristics about the data itself. Metadata may be used to manipulate and/or manage the objects in a storage system.

In the context of cloud computing, the architecture of a cloud storage system may include multiple tiers including, but not limited to (1) a data tier responsible for durably and reliably persisting object data, (2) a metadata tier responsible for persisting object metadata and tracking the status of objects stored within the storage system, and (3) a front-end tier responsible for orchestrating operations across the data and metadata tiers. The underlying hardware and software infrastructure supporting each of the tiers may be constantly evolving. New storage offerings may reduce costs, improve performance, and render old storage technology obsolete. Adding to the complexity of cloud storage systems, object data may be distributed across many different types of storage media, such as hard disk drive (HDD) servers, optical drives, flash drives, tape libraries, etc. The underlying physical storage format of object data and metadata may vary depending on the type of storage media on which the data is stored.

The constantly changing and varied architectures of cloud storage systems present several challenges. If data is not efficiently organized within the storage system, then data access times may be suboptimal, negatively impacting the quality of service (QoS) provided to cloud consumers. In addition, poorly organized data placement may lead to inefficient and cumbersome data migration as new storage technology is deployed within the cloud environment.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. STORAGE SYSTEM ARCHITECTURE
3. DATA PLACEMENT FOR EFFICIENT ACCESS AND MIGRATION
4. HARDWARE OVERVIEW
5. MISCELLANEOUS; EXTENSIONS

1. GENERAL OVERVIEW

Poor data placement and organization in a cloud storage system may lead to increased storage overhead, slower data access time, and inefficient data migration. One approach to organizing data is to employ a set of heuristics in an effort to fit the most number of data objects in the fewest number of storage containers, also referred to as bins or files. This approach may reduce storage overhead in the cloud storage system by minimizing the total number of storage containers maintained within the storage system. However, the approach may lead the storage system to pack data objects that are frequently accessed together into separate bins. For example, data objects that are sequentially migrated, restored, or otherwise accessed may be distributed across several different storage containers. As a result, data migrations, restorations, and/or other storage system operations may be negatively impacted.

Techniques described herein provide systems and methodologies for organizing data within a storage system based on access patterns. By accounting for access patterns, data objects that are frequently accessed together may be organized within the storage system in a manner that optimizes for storage system operations. For instance, data objects that are likely to be sequentially accessed may be placed within consecutive storage locations and/or bin-packed within the same file. During migration, restoration, or other access operations, the data objects may be sequentially read or streamed from the consecutive storage locations.

In one or more embodiments, a storage system is configured to monitor data accesses and to extrapolate access patterns. For example, the storage system may be configured to monitor for repeated patterns of sequential or "group" accesses, where objects having one attribute are accessed at or around the same time in sequence.

The storage system may use the access patterns to learn how best to organize data received in the future. For example, storage system may receive a request to write or otherwise store a set of objects. In response, the storage system may determine which objects should be stored consecutively, if any, within a file.

In addition or alternatively, the storage system may use the access patterns to reorganize data that already is stored. For example, if two or more objects are frequently accessed together but reside in separate storage locations, storage system may move the objects into consecutive storage locations to speed up future access requests.

In addition or alternatively, a storage system may be configured to organize a set of data objects into files based on user-specified information. Tenants may inject domain knowledge about anticipated access patterns in order to drive placement of the data with a cloud storage system. The domain knowledge may be used to determine how to organize a set of objects associated with the tenant, such as which objects to bin-pack into a file, which objects to store consecutively, etc.

2. STORAGE SYSTEM ARCHITECTURE

Figure 1:
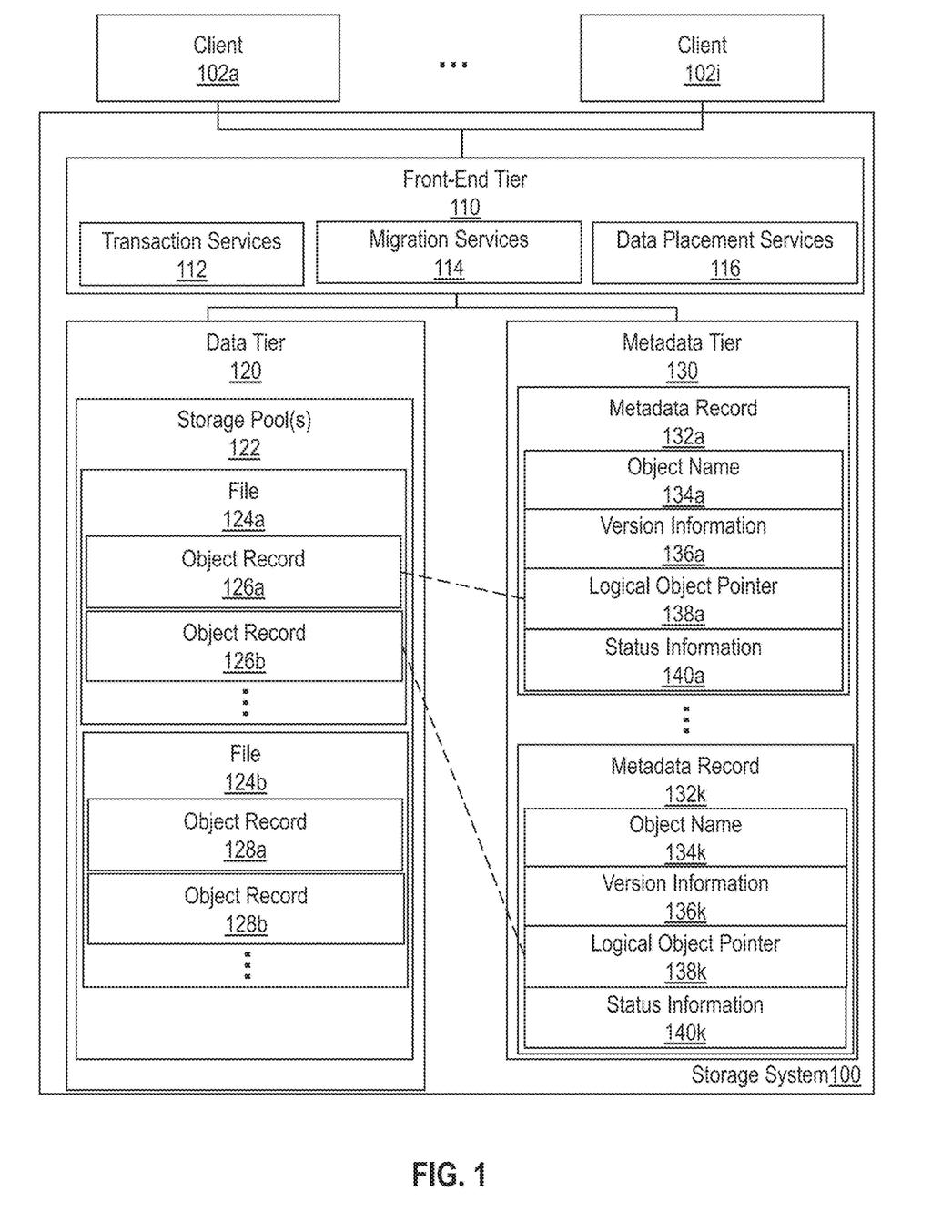
FIG. 1 illustrates an example storage system in accordance with one or more embodiments.

FIG. 1 illustrates example storage system 100 in accordance with one or more embodiments. As illustrated in FIG. 1, system 100 includes front-end tier 110, data tier 120, and metadata tier 130. In one or more embodiments, storage system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, data tier 120 and/or metadata tier 130 are implemented using one or more data repositories. A data repository is any type of storage unit and/or device (e.g., a file system, database, collection of tables, disk, tape cartridge, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as front-end tier 110. Alternatively or additionally, a data repository may be implemented or executed on a computing system separate from front-end tier 110. A data repository may be communicatively coupled to front-end tier 110 via a direct connection or via a network. Different tiers may transmit messages and data to other tiers using one or more network communication protocols, such as communication protocols associated with the Internet Protocol (IP) Suite. In addition or alternatively, different tiers may transmit data using one or more communication protocols for passing messages between components executing on the same host machine, such as issuing function calls, issuing interrupts, and posting work requests in a queue.

In one or more embodiments, data tier 120 comprises hardware and/or software configured to store object data associated with objects of a storage system. As illustrated, data tier 120 includes one or more storage pools (such as storage pools 122a-j). A storage pool in this context represents a set of storage components that are grouped together. The grouping may be performed based on common attributes, such as storage media type, geographic location, or any other attribute or combination of attributes. For example a storage pool may correspond to an aggregation of hard disk drive (HDD) storage servers, compute servers, erasure coded storage, tape libraries, etc.

In one or more embodiments, data tier 120 is subdivided into different storage tiers or classes. Example storage tiers/classes may include, but are not limited to:

(a) a replication tier including one or more storage pools that replicate data over two or more storage devices;
(b) a disk tier including one or more storage pools comprised of HDD storage servers and/or other physical disk storage components;
(c) an erasure encoded tier including one or more storage pools that store erasure-encoded data objects; and/or
(d) an archive tier including one or more storage pools that are used to archive old and/or infrequently accessed data.

In one or more embodiments, storage pools 122a-j each store a set of files (such as files 124a-b). Each file stores a set of object records. With reference to storage pool 122a, for instance, file 124a stores a set of object records, including object records 126a-b. File 124b also stores a set of object records, including object records 128a-b. An object record stores object data, such as a binary large object (BLOB), binary file objects (BFILE), executable binaries, and/or user data stored in any other format. In addition, each object record may store object metadata, such as an object name, version number, etc. The object metadata within an object record is stored separately from the object metadata maintained in metadata tier 130.

Files and objects stored in one storage pool may also be replicated and/or migrated across different storage pools. For example, file 124a may be migrated or replicated from storage pool 122a to storage pool 122j. The physical storage format of the object records that has been migrated may be different or the same within storage pool 122a and storage pool 122j, depending on the particular implementation. For instance, if storage pool 122a is a HDD server, object record 126a may be stored in HDD blocks. If storage pool 122j is an erasure-encoded server, then object record 126a may be stored in an erasure-encoded format. As another example, if storage pool 122j is a tape library, then object record 126a may be formatted for storage on a tape cartridge.

In one or more embodiments, metadata tier 130 refers to hardware and/or software configured to store metadata associated with objects of a storage system. As illustrated, metadata tier 130 includes one or more metadata records (such as metadata records 132a-k). Metadata records 132a-k store object metadata for corresponding data objects stored within data tier 120. The object metadata includes the object name (such as object names 134a-k), version information (such as version information 136a-k), a logical object pointer (such as logical object pointers 138a-k), and status information (such as status information 140a-k).

Object names 134a-k may be any value such as a sequence of alphanumeric characters assigned to an object as a label or identifier. Object names 134a-k may be chosen by a user, a storage client, or storage system 100 depending on the particular implementation. An object and object name may be associated with one or more versions of an object. The one or more versions of the object may be stored within a single storage pool and/or replicated across different storage pools within data tier 120.

Version information 136a tracks different versions of an object stored within storage system 100. In one or more embodiments, metadata records 132a-k include separate metadata records for each different version of an object. Each time a new object is created, a new metadata record is generated for storing the metadata of the object. Each time the object data of an object is changed, the metadata record may be updated and/or a new version-specific metadata record may be generated for storing the metadata associated with the new object data of the object.

Each time the metadata corresponding to a particular version of object data of an object is changed, the existing metadata record for the particular version of object data is overwritten with new metadata. The metadata may change due to a user request and/or a system request. User requests may be received from a user via a user interface and/or application programming interface (API). System requests may be received from an application and/or a process. As an example, metadata associated with an object may include a flag indicating whether a transaction event record of the object has been published. After publishing a particular transaction event record, a publisher may request that the flag associated with the particular transaction event record become marked. The request from the publisher is an example of a system request to modify the metadata of the object.

In one or more embodiments, metadata records 132a-k each include a respective logical object pointer (logical object pointers 138a-k). A logical object pointer in this context identifies a logical storage location within data tier 120 where a corresponding object record is stored. For instance, logical object pointer 138a identifiers a logical storage location for object record 126a, and logical object pointer 138k points to object record 126b.

In one or more embodiments, a logical object pointer points to a single logical storage location. The logical storage location may be mapped to one or more physical storage locations. For example, logical object pointer 138k may point to a single logical storage location within data tier 120 where object record 126b is stored. Object record 126b may be stored in multiple physical storage locations, allocated from storage pool 122a and 122j, due to an ongoing migration or replication. The logical storage location for object record 126 may be mapped to each physical storage location where object record 126b is stored within data tier 120.

In one or more embodiments, files 124a and 124b represent volumes, which may serve as a logical unit of migration as described further below. In the event of a migration or replication event, objects within the file may be sequentially migrated or streamed to a new storage location. The logical storage location of the object records within a volume do not change in accordance with one or more embodiments. By maintaining the same logical storage location, logical object pointers 138a-k are still valid before and after migration without any updates. Thus, the processing load on metadata tier 130 may be greatly reduced.

In one or more embodiments, each of metadata records 132a-k maintains status information about a corresponding object and/or version of the object. For example, status information 140a may track whether object record 126a is an active/committed version of an object, pending an update, marked for deletion, etc. Similarly, status information 140k may track the status of object record 126b. Transaction services 112 may update status information 140a in response to write and/or other operations that modify object data. As previously indicated, data migrations and replication may be performed with minimal or no updates to metadata records 132a-k. Thus, large-scale migrations have little to no impact on transactional operations (such as creating new metadata records and overwriting existing metadata records) that read and write data to metadata tier 130.

In one or more embodiments, front-end tier 110 is communicatively coupled or otherwise configured to receive requests from clients 102a-i. Clients 102a-i represent processes, applications, or other users for which storage system 100 stores data. For example, clients 102a-i may include, but are not limited to, one or more instances of a database server, application server, middleware application or some other resource. In the context of a cloud environment, clients 102a-i may correspond to a database-as-a-service (DBaaS), software-as-a-service (SaaS), platform-as-a-service (PaaS), a cloud tenant/user, or any other cloud resource. Clients 102a-i may reside locally or be remote from storage system 100.

In one or more embodiments, clients 102a-i represent cloud resources that are associated with different cloud tenants. A cloud tenant refers to a set of one or more users that share common access to storage system 100. For example, a cloud tenant may correspond to an account that has a set of privileges attached that provide access a subset of data within storage system 100. One or more users may be authorized to use the account.

In one or more embodiments, front-end tier 110 comprises hardware and/or software configured to expose a user interface and/or an API for receiving requests. The API may conform to a Representational State Transfer (REST) architectural style. The commands exposed to clients 102a-i through the API may include but are not limited to:
  (a) storing object data and/or metadata for an object;
  (b) reading object data and/or metadata for an object;
  (c) deleting object data and/or metadata for an object;
  (d) restoring objects from an archive or backup storage tier; and
  (e) migrating object data and or metadata for an object between different storage locations.

In one or more embodiments, front-end tier 110 includes transaction services 112, migration services 114, and data placement services 114. Transaction services 112 includes logic for handling transactions on behalf of clients 102a-i. For example, responsive to a request to write an object to storage system 100, transaction services 112 may interact with data tier 120 and/or metadata tier 130 to coordinate a write transaction. Transaction services 112 may monitor the write transaction to determine whether to commit or abort changes within data tier 120 and/or metadata tier 130.

Migration services 114 includes logic for handling data migrations between different storage components. In one or more embodiments, migration services 114 maintains a set of policies that control migration of client data. Example policies may include, but are not limited to:
  (a) Container policies configured by clients to drive the movement based on the age of the data;
  (b) System policies configured by the storage provider to drive movement of the data based on the age of the underlying storage technology; and
  (c) Durability and availability policies configured by the system administrator (such as a cloud service provider)

to ensure that service-level agreements (SLAs) with cloud service consumers are satisfied.

In one or more embodiments, migration services 114 includes a set of processes for extracting data from a source storage component and loading the data to a destination storage component. The extraction and loading processes may map data from the destination storage component to the source storage component. If the source and destination storage components have different physical layouts, then migrations services 114 may relate the source format to the new format in the destination storage component. For example, during migration from disk to tape, migration services 114 may map hard disk data blocks to a tape cartridge where the blocks were migrated.

In one or more embodiments, migrations services 114 includes logic for migrating data within data tier 120 without changing location information for the migrated data objects in metadata tier 130. As previously mentioned, the logical storage location may remain the same both before and after migration of a data block. The underlying physical storage component to which the logical storage location is mapped may be changed. However, these changes may be made within data tier 120 without modifying the logical object pointer and metadata records within metadata tier 130.

Data placement services 116 includes logic for organizing data within data tier 120 and/or metadata tier 130. Data placement services 116 may select a storage pool in which to store data based on migration policies (such as container policies), object sizes, object type (such as zero byte file, large object manifest file) pool statistics (such as utilization rates, load, storage tier, status etc.). For example, responsive to a request to store a set of objects within storage system 100, data placement services 116 may select a pool that satisfies a container policy that has the lowest load and sufficient capacity to store the set of objects. The selection criteria may vary from implementation to implementation and may be configurable by a storage administrator.

In one or more embodiments, data placement services 116 includes logic for bin-packing objects into a set of files. Responsive to a request to write a set of objects within storage system 100, data placement services 116 may determine which objects to place in the same file as well as the order in which the objects should be stored in the file. As described in further detail below, data placement services 116 may organize objects records based on access patterns and/or user-specified information.

In one or more embodiments, front-end tier 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant ("PDA").

3. DATA PLACEMENT FOR EFFICIENT ACCESS AND MIGRATION

A. Volumes

In one or more embodiments, files 124a-b correspond to separate volumes within storage system 100. A "volume" in this context is used synonymously with bin-packed file. A volume may represent a logical storage unit that is allocated from a storage pool. A volume may further represent a slice of underlying capacity within a storage pool. Multiple volumes may be allocated from a single storage pool depending on the total storage capacity of the storage pool and the size of each volume, which may vary from implementation to implementation.

In one or more embodiments, object data is encapsulated in a volume. For example, BLOBs may be encapsulated in a volume as a bit-stream, where the bit stream is physically stored as bits or captured in a trained executable. A bit-stream or other object data encapsulated in the volume may be retrieved by directly reading the physical storage location or by executing the trained executable stored at the storage location.

Figure 2A:
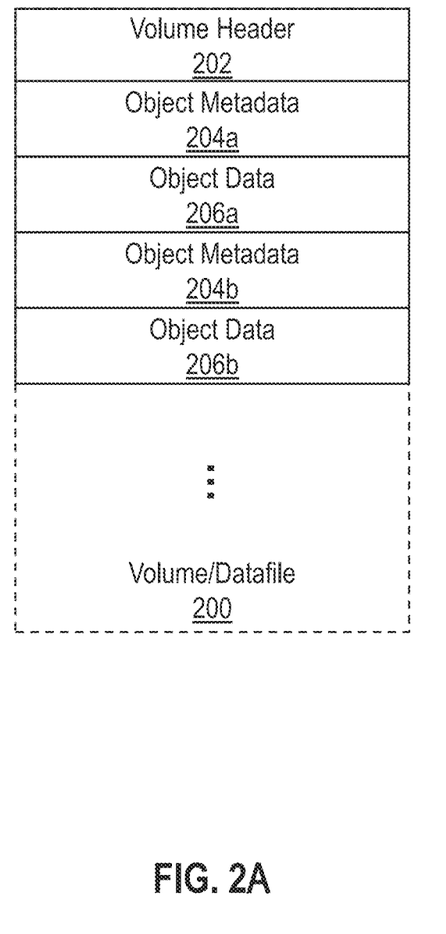
FIG. 2A illustrates an example volume schema in accordance with one or more embodiments.

In one or more embodiments, the structure of a volume includes both data and metadata. FIG. 2A illustrates an example schema for volume 200 in accordance with one or more embodiments. The schema for volume 200 includes volume header 202, object metadata (such as object metadata 204a-b), and object data (such as object data 206a-b). Volume 200 bin-packs data for multiple objects into a single logical unit of migration. The number of objects that are bin-packed into a single volume may vary from implementation to implementation depending on the storage capacity allocated to the volume. Bin-packing may be performed based on detected access patterns, user input, and/or other object attributes as described further in the sections below.

In one or more embodiments, each respective object stored within volume 200 is associated with a unique identifier. For example, the unique identifier may be a combination of the volume identifier and an offset, where the volume identifier is a value (such as an alphanumeric sequence) that uniquely identifies a volume within storage system 100 and the offset is a value that identifies the beginning of the object data in a volume bit-stream.

In one or more embodiments, the offset is a logical entity that represents the location of object data in space or time. When the offset is a logical construct, a mapping table may be embedded in the volume. For instance, the mapping table may be stored within volume header 202 or some other predefined location within the volume. For space offsets, the embedded mapping table maps logical offsets to physical offsets. A space offset of "500" may map to 500 megabytes (MB) in one physical storage component and one gigabyte (GB) in another storage component. For time offsets, the embedded mapping table maps logical offsets to time codes or a time index.

In one or more embodiments, the offset indicates the location of an object record with respect to the beginning of the volume. For instance, if object record 126a is stored within a volume denoted "V5" at an offset of 500, the offset may indicate that the object record is the $500^{th}$ record in the volume or that the object is located 500 logical storage units from the beginning of the volume. A value of "V5:500" may be used to uniquely identify the object within storage system 100. The unique identifier may be assigned to logical object pointer 138a within metadata record 132a.

A unique identifier assigned to a version of an object may be used by any tier within storage system 100 to interface with storage pools 122a-j and access the corresponding object data. For example, front-end tier 110 may use logical object pointer 138a to read, write, or otherwise access object record 126a. Metadata tier 130 may also use logical object pointer 138a to interface with storage pool 122a and access object record 126a.

In one or more embodiments, the volume identifier and offset assigned to an object do not change if the volumes are migrated or replicated. For example, logical object pointer 138k may have a value of "V5:600" meaning object record 126b is stored in the same volume as object record 126a but at a different logical offset. Initially, the volume "V5" may be stored only in storage pool 122a. The volume may then be migrated or replicated to storage pool 122j. During and after migration, logical object pointers for all data objects within the volume are retained. The logical object pointers may remain constant as the logical structure and format of the volume does not change. Even though the logical constructs of the volume remain constant, the underlying physical structure and format of the stored object data may change.

B. Physical Layout Mappings

Within data tier 120, volumes may be migrated and/or replicated between different storage tiers, locations, and storage technologies. When a volume is migrated from one storage component to another storage component, the physical layout of the data may change. For example, migrating the data from an HDD server to an erasure-encoded server may involve transforming data in disk blocks into an erasure-encoded format. As another example, migrating data from an HDD server to a tape may involve formatting the data for storage on a tape cartridge.

In one or more embodiments, a volume is associated with one or more layout representations. A layout representation in this context is a set of data that represents the topology of an underlying physical storage. For example, a layout may include a mapping to disk blocks, extents, tape cartridges, physical storage addresses, or any other media-specific storage location information. In addition or alternatively, a layout may represent logic that is used to regenerate object data on request. For example, the layout may be a stored executable that, upon execution, generates an object record.

Figure 2B:
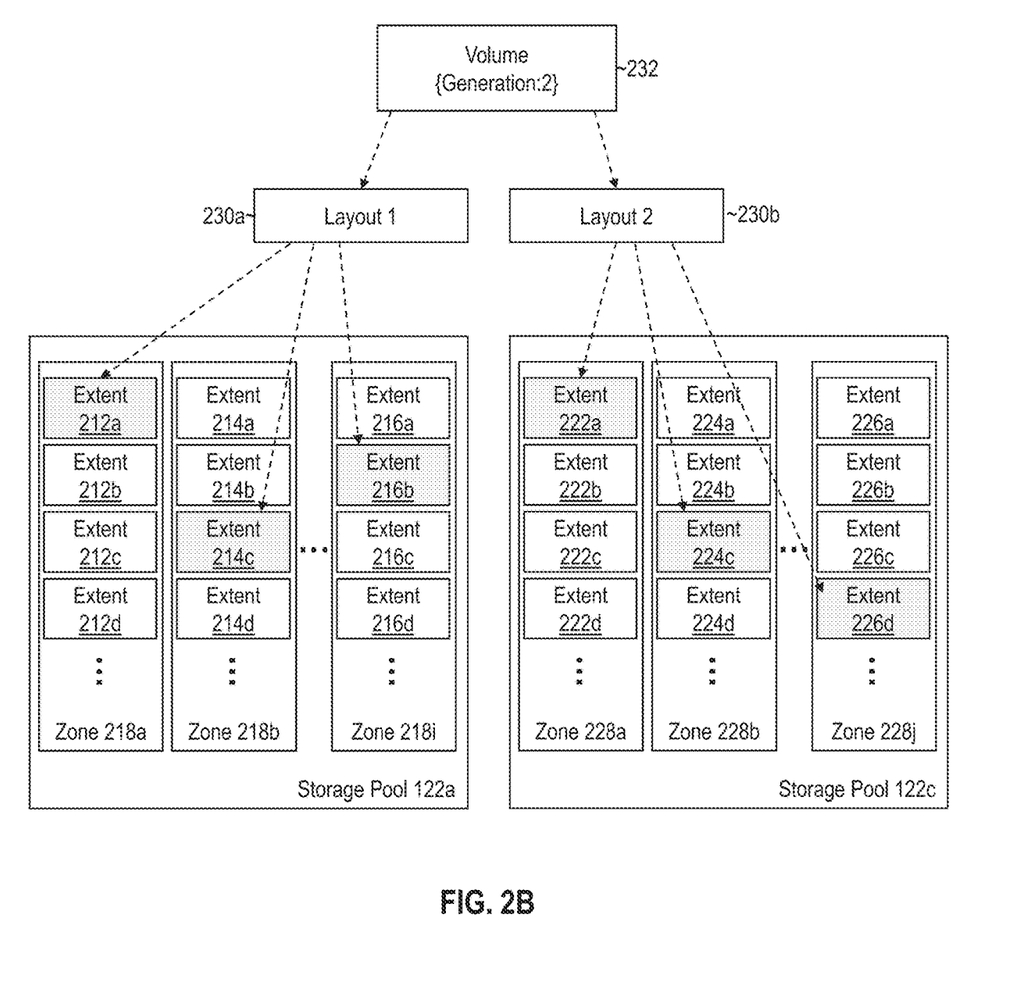
FIG. 2B illustrates an example set of layout representations within a volume in accordance with one or more embodiments.

FIG. 2B illustrates an example set of layout representations within a volume in accordance with one or more embodiments. As previously illustrated, volume 232 is associated with two separate layouts. Layout 230a is mapped to a set of extents within storage pool 122a, including extent 212a, extent 214c, and extent 216b, on which volume 232 is stored. Layout 230b is mapped to a different set of extents within storage pool 122c, including extent 222a, extent 224c, and extent 226d, on which the volume is also stored. An "extent" in this context refers to a contiguous block of physical storage. As previously mentioned, in other embodiments layouts may be mapped to other forms of physical storage, such as tape cartridges disk blocks, etc., depending on the underlying format of the storage media.

Storage pool 122a and storage pool 122c include multiple extents distributed across a plurality of zones. Within storage pool 122a, zone 218a includes extents 212a-d, zone 218b includes extents 214a-d, and zone 218i includes extent 216a-d. Within storage pool 122c, zone 228a includes extents 222a-d, zone 228b includes extents 224a-d, and zone 228j includes extents 226a-d. A zone in this context may represent a different compute zone, storage area, geographic location, or storage device within a storage pool. As illustrated, a subset of extents distributed across multiple zones may be used to store the object data and metadata within a volume.

In one or more embodiments, object records that are logically consecutive within a volume are stored consecutively in physical storage as well. For example, if object record 126a and object record 126b represent different objects that have been consecutively stored within file 124a, these object records may be stored contiguously in each of the extents on which the volume is stored, such as extent 212a, extent 214c, extent 216b, extent 222a, extent 224c, and extent 226d. In other embodiments, files that are logically consecutive within a file may not be stored consecutively in physical storage. For instance, object record 126a may be stored at one physical storage location and object record 126b may be stored at a noncontiguous storage location on the same storage device and/or a different storage device.

Volume 232 includes a version/generation number which tracks updates to the volume. For example, the generation number may be updated each time a new layout is attached to the volume. The generation number may be used to determine the most recent version of volume 232 and to prevent the use of obsolete layouts. New layouts may be generated and attached to a volume during replication and/or migration operations. In addition or alternatively, a new layout representation may also be generated and attached in the event of volume updates. For example, data placement services 116 may reorganize a set of volumes based on detected access patterns. During reorganization, a data object in one volume may be moved to a different volume. In response to any such updates to the volume, the respective generation count of the volume is updated.

In one or more embodiments, multiple layouts may be active at a given point in time. For instance, both layout 230a and layout 230b may be used to store object data within volume 232. Access requests, such as reads and writes, may be directed to either active layout or both, depending on the implementation. Techniques for processing read and write requests are discussed in further detail below.

As previously discussed, a single logical object pointer may be mapped to a particular volume identifier and offset. The layout representation may be used to determine the underlying physical storage location for the offset. For example, the logical object pointer "V232:800", pointing to an object record within volume 232 stored at offset 800, may map to a first extent within layout 230a and a second extent within layout 230b. In other examples, the layout may map a logical object pointer to a tape cartridge, data block or some other physical storage location where the corresponding data object is stored.

C. Bin-Packed Files Based on Access Patterns

In one-or more embodiments, data placement services 116 is configured to bin-pack data objects into volumes based on detected access patterns. Data placement services 116 may place objects within the same volume/file that are likely to be sequentially accessed. For example, if two objects have a high probability or certainty of being migrated at the same time to an archive tier, then the objects may be placed in the same volume. When all data object within a volume are migrated together, the structure of the volume may be maintained before and after migration. This allows for streamlined data migrations that do not impact the metadata tier. In other examples, data objects that are likely to be sequentially read, replicated, and/or restored may be placed within the same volume to optimize data access times.

Figure 3:
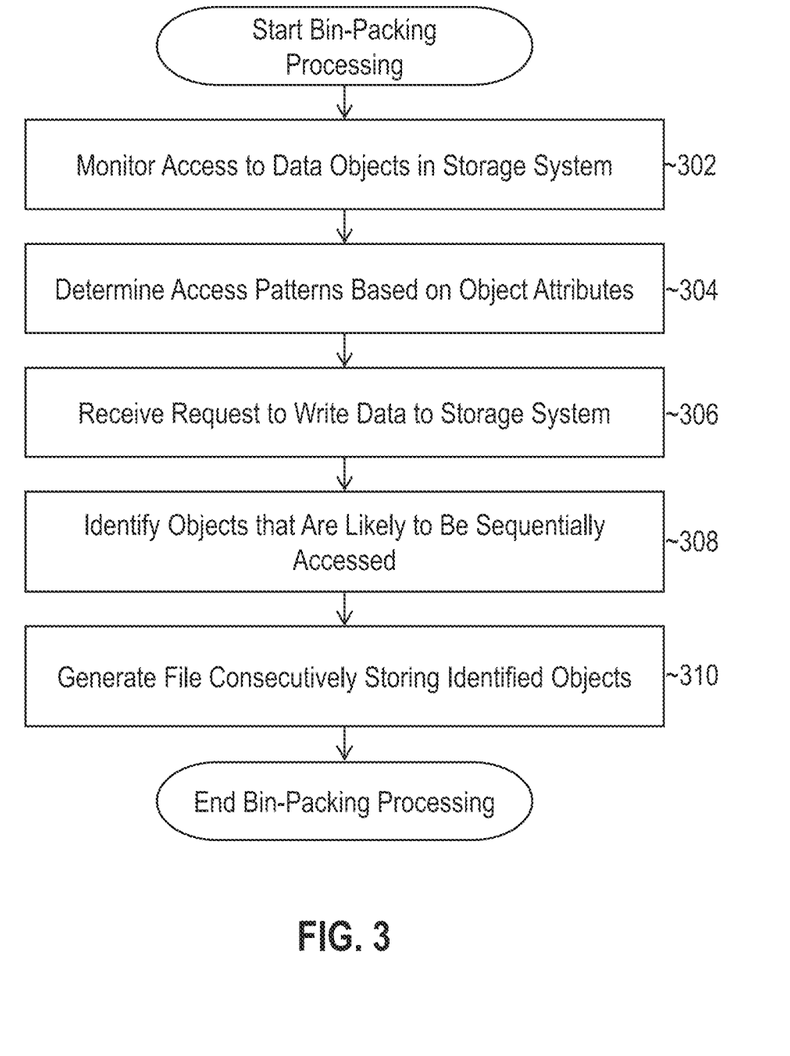
FIG. 3 illustrates an example set of operations for bin-packing object data into a file in accordance with one or more embodiments.

FIG. 3 illustrates an example set of operations for bin-packing object data into a file in accordance with one or more embodiments. The bin-packing process includes monitoring access to data objects within storage system 100 (Operation 302). For example, transaction services 112 may track reads, writes, restores, replication, and/or migration of data within storage system 100. For each monitored operation, transaction services 112 may store, within a table or other data structure, information identifying the type of operation that was performed, the time the operation was performed, the object information identifying attributes of the data objects that were accessed during the operation.

While monitoring is ongoing or after monitoring has completed, data placement services 116 identifies a set of access patterns that are correlated with attributes of the object records being accessed (Operation 304). In one or more embodiments, data placement services 116 is configured to detect patterns of sequentially migrating, restoring, and/or reading data object with specific attributes. For example, data placement services 116 may detect that tables tracking customer information are frequently migrated with tables tracking sales data. In other examples, data placement services 116 may detect data objects associated with one attribute are frequently migrated, restored, or otherwise accessed sequentially with data objects having another attribute.

In one or more embodiments, data placement services 116 is configured to provide machine learning to identify access patterns. With machine learning, data placement services 116 gathers a set of training data during the monitoring operation described above (Operation 302). Data placement services 116 then trains an analytical model to learn the access patterns the occur within storage system 100. An example clustering analytical model is described in further detail in the section below. In addition or alternatively, other analytical models, such as correlation models, density estimation, and classification models may be trained to determine access patterns.

Once a set of access patterns have been identified, transaction services 112 receives a request from a client to write a set of data objects (Operation 306). In the context of a DBaaS, for example, a tenant may request to write a set of database objects to a cloud storage system. In other cloud service models, application data, user data, or any other set of tenant may be included in the request.

Responsive to receiving the request, data placement services 116 determines which objects are likely to be sequentially accessed (Operation 308). In one or more embodiments, data placement services 116 analyzes the attributes of the set of objects and compares the attributes to the detected access patterns. For example, data placement services 116 may determine that the set of objects includes two or more objects that share attributes with objects following a particular access pattern. For instance, the set of objects may include tables generated by a Human Resource Application and tables generated by a Sales Application. If data placement services 116 determines that tables for both applications having the same age are frequently migrated together, then data placement services 116 may classify these tables as likely to be sequentially accessed.

In other examples, data placement services 116 may compare and analyze other attributes of the set of objects. Example attributes that may be analyzed may include, but are not limited to:

(a) Logical groups: In a cloud computing environment, data objects may be associated with different containers or other logical groups. In the context of a DBaaS, for instance, data objects for different departments (such as information technology, human resources, sales, etc.) may be associated with different types of containers to distinguish the data and control access privileges.

(b) Policies: Data objects may be associated with one or more policies, such as lifecycle policies that control data migrations, data retention policies that control data archiving, security policies that restrict tenant access, etc.

(c) Data age: Data objects may be associated with a timestamp that tracks the a time at which the object was created and/or last updated.

(d) Object size: This attribute track the amount of data in an object, which may vary between different objects.

(e) Object type: This attribute identifies a datatype for the object. For example, this attribute may identify whether the object is a table, a view, an executable, an image, etc.

(f) Name prefixes: In some cases, the name of related objects may share the same prefix. For example, a sequence of data object may be named as follows "Foo1", "Foo2", "Foo3". The prefix "Foo" may be useful in analyzing access patterns with respect to this group of objects.

Any of the object attributes described above may be encapsulated in object metadata. When a set of objects is received, data placements services 116 may determine based on the attributes encapsulated in the object metadata and the previously identified access patterns, which objects are likely to be sequentially accessed.

Data placement services 116 then generates a file that consecutively stores the identified data objects (Operation 310). As previously indicated, the file may be a volume that stores the objects at logically contiguous offsets. The data objects may or may not also be stored at physically contiguous storage locations, depending on the particular implementation.

In one or more embodiments, data placement services 116 is configured to place objects that are not likely to be accessed as a group in different files. For example, a set of objects to be stored may include one subset of objects that are scheduled to be archived in a three-month period and another subset of object scheduled to be archived in a one year period. The different subsets of data may be stored in separate volumes to optimize anticipated data migrations. Thus, the subset associated with the three-month retention timeframe may be stored consecutively within one volume (or a set of volumes if the capacity of a single volume is too small). The subset of objects associated with the one year retention timeframe may be stored consecutively in a separate volume (or set of volumes).

In the examples given above, access patterns detected in historical data is used to organize subsequently received data. In addition or alternatively, the access patterns may be used to reorganize currently existing volumes. For example, data placement services 116 may determine that object record 126a and object record 128a are frequently accessed together, and that object record 126b and object record 126b are frequently accessed together. In response, a background process may reorganize file 124a to remove object record 126b and add object record 128a. The background process may similarly reorganize file 124b to add object 126b and remove object record 128a.

The access patterns detected within storage system 100 may be used to control various volume parameters, in accordance with one or more embodiments. For example, data placement services 116 may determine, based on the access patterns, which data objects are stored within the same volume, the order in which data objects are stored within a volume, the number of volumes to generate, and/or the size of the volumes. Data placement services 116 may adjust these parameters in order to minimize the overhead on data tier 120 and/or metadata tier 130 incurred by large-scale access operations such a migrations and restorations.

D. Cluster-Based Pattern Detection and File Generation

As previously mentioned, data placement services 116 may provide machine learning to identify access patterns. In one or more embodiments, data placement services 116 implements a clustering model to determine and classify access patterns.

Figure 4:
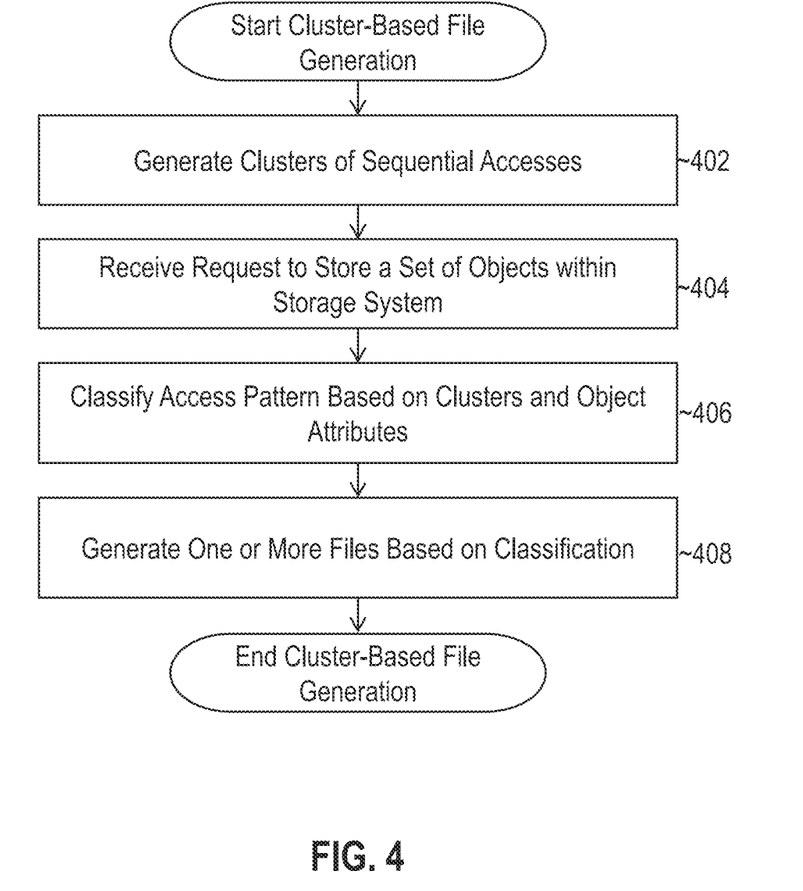
FIG. 4 illustrates an example set of operations for organizing data within a storage system based on clustering in accordance with one or more embodiments.

FIG. 4 illustrates an example set of operations for organizing data within a storage system based on clustering in accordance with one or more embodiments. The process begins by generating a set of clusters that group sequential accesses (Operation 402). Each data point within a cluster may represent a sequential access of two or more data objects. For example, a group of data objects that are migrated together may represent one sequential access within a cluster. Another group of objects that are migrated in a separate migration operation may represent a second point within a cluster.

In one or more embodiments, sequential accesses are assigned to clusters based on object attributes. For example, a migration operation may involve migrating a set of data objects, each data object in the set having a unique set of attributes. A similarity function may receive the attributes for the set of data objects as input and compare the attributes (or some subset thereof) to attributes of previously detected data migrations. The migration may then be assigned to a cluster that shares the most similar sequential access as determined by the similarity function.

Once the clusters have been generated, storage system 100 subsequently receives a request to store a set of objects (Operation 404).

In response to receiving the request, data placement services 116 classifies an access patterns for the set of objects based on the object attributes and the generated clusters (Operation 406). For example, the similarity function may be used to assign the objects to a particular cluster. Each cluster in this example may represent a different bin-packing algorithm for organizing the set of objects.

Based on the classification, data placement services 116 generates one or more bin-packed files (Operation 408). For example, data placement services 116 may determine, from the access pattern associated with the cluster to which the request was assigned, which data objects are likely to be accessed sequentially. Data placement services 116 may then store these objects consecutively within one or more volumes/files.

E. Tenant-Directed Placement in Cloud Storage

In one or more other embodiments, storage system 100 is configured to provide tenants with a level of control over the data placement. Storage system 100 may receive from a tenant, user-specified information indicating anticipated access patterns. For example, a tenant may specify that objects associated with one container should be migrated together with objects associated with another container. Data placement services 116 may use the user-specified information, in addition or as an alternative to the learned access patterns, to determine how to organize data within storage system 100.

Figure 5:
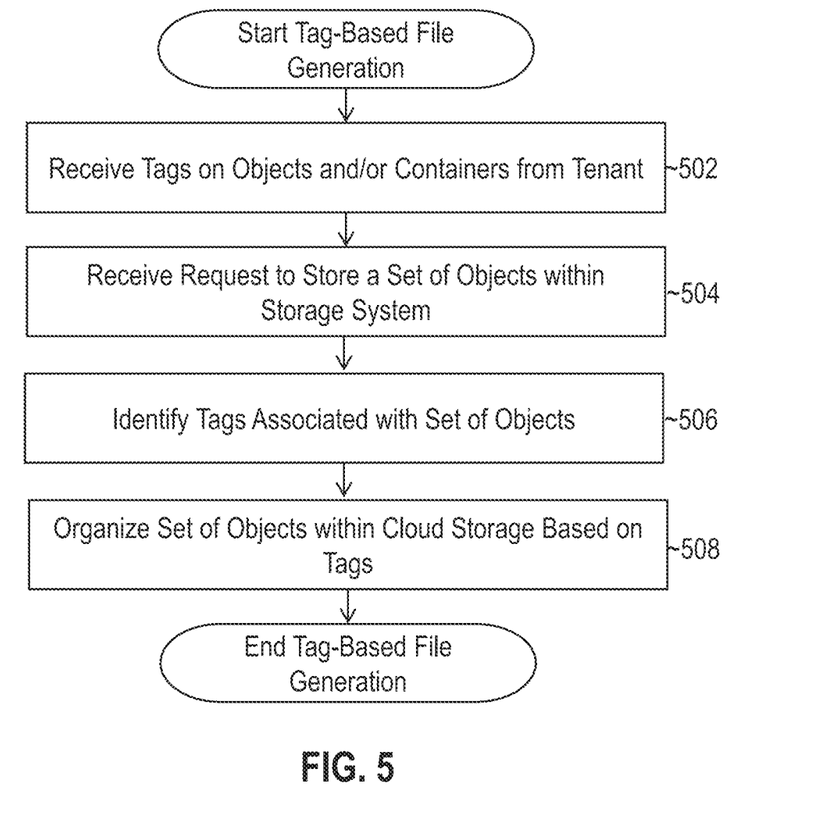
FIG. 5 illustrates an example set of operations for organizing data within a storage system based on user-specified information in accordance with one or more embodiments.

FIG. 5 illustrates an example set of operations for organizing data within a storage system based on user-specified information in accordance with one or more embodiments. The process begins by receiving, from a tenant of a cloud storage environment, tags on data objects or containers (Operation 502). A "tag" in this context is metadata that is attached to a data object itself and/or a container (or logical group) with which the data object is associated. The tag conveys information provided by the tenant about anticipated sequential access patterns.

In one or more embodiments, tags are applied to specific data objects. These tags may indicate, for instance, that two or more objects are anticipated to be migrated, restored, read, or otherwise accessed together.

In one or more embodiments, tags may be applied to containers (or other object attributes) rather than the specific data objects themselves. This allows the user to specify a placement policy based on object attributes such that the user does not have to apply a tag each time a new object is created. For example, the user may tag containers associated with a sales and human resources department. When a Sales Application and a Human Resources Application create new data, data placement services 116 may combine the data into a single volume.

A tag may or may not indicate a specific order in which to store the data objects. For example, tag values may be incremented in a sequence such that the user may specify the order in which data objects should be organized within a file. Thus, a tag "1" may be attached to one table, a tag "2" may be attached to a second table, etc.

Tags may specify which objects should be placed in the same file as well as objects that should be placed in different files. For example, a user may use a common tag on all objects that should be grouped together in one or more files. The user may use a different tag for another set of objects that should be grouped together in a separate set of files.

After the user has tagged objects and/or containers, storage system 100 may subsequently receive a request to store a set of objects (Operation 504).

Responsive to receiving the request, data placement services 116 identifies the set of tags with which the set of objects is associated (Operation 506). In one or more embodiments, data placement services 116 parses the object metadata to determine if the user has tagged the objects. In addition or alternatively, data placement services 116 may determine whether the user has tagged a container or some other set of attributes that indicates anticipated access patterns.

Based on the identified tags, data placement services 116 organizes the data objects within data tier 120 (Operation 508). For example, data placement services 116 may store the data, logically and/or contiguously, in an order conveyed by the tags. As another example, data placement services 116 may place data objects in the same or different volumes based on the information captured by the tags.

4. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
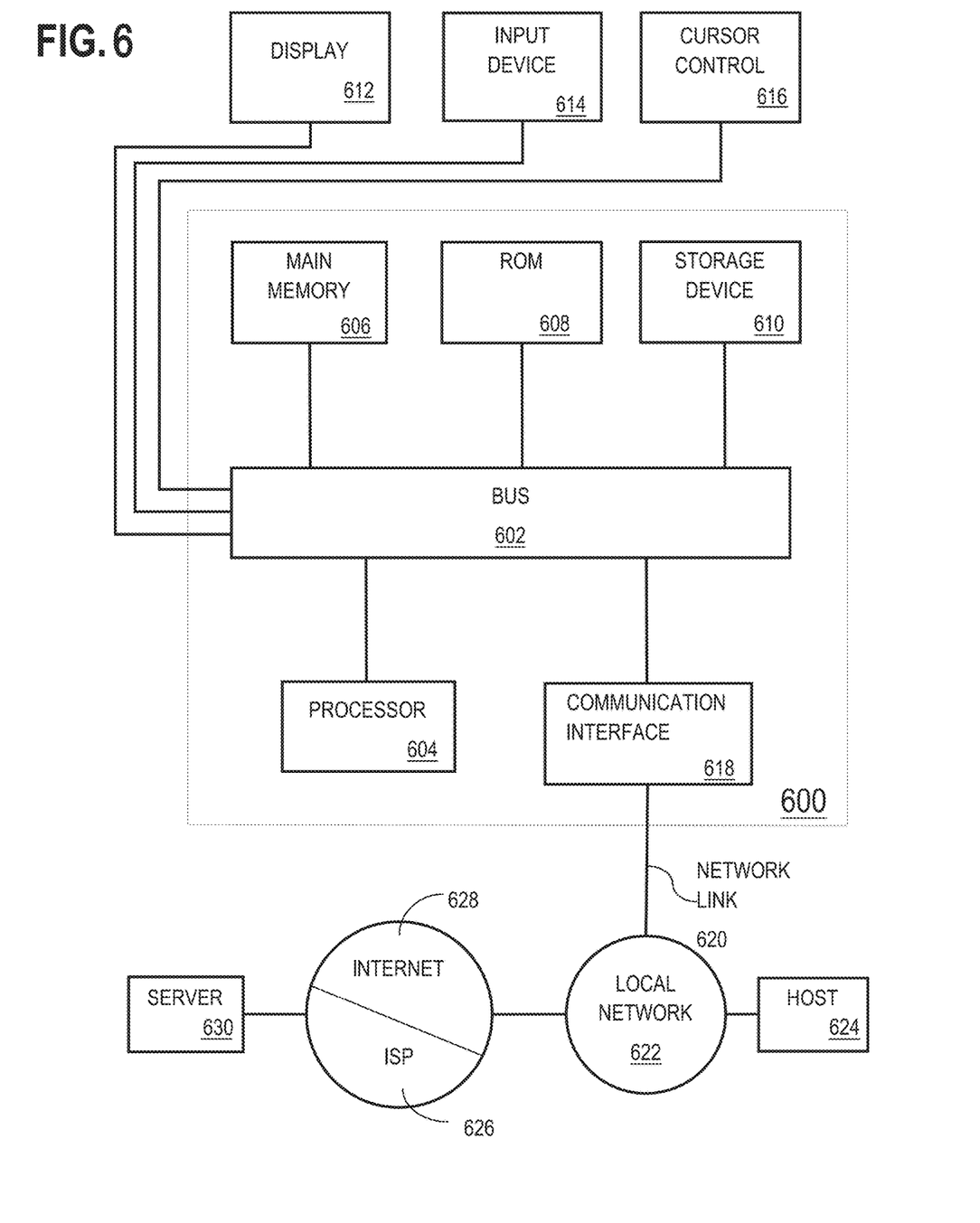
FIG. 6 illustrates an example computer system upon which one or more embodiments may be implemented.

For example, FIG. 6 is a block diagram that illustrates computer system 600 upon which one or more embodiments may be implemented. Computer system 600 includes bus 602 or other communication mechanism for communicating information, and hardware processor 604 coupled with bus 602 for processing information. Hardware processor 604 may be, for example, a general purpose microprocessor.

Computer system 600 also includes main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes read only memory (ROM) 608 or other static storage device coupled to bus 602 for storing static information and instructions for processor 604. Storage device 610, such as a magnetic disk or optical disk, is provided and coupled to bus 602 for storing information and instructions.

Computer system 600 may be coupled via bus 602 to display 612, such as a cathode ray tube (CRT), liquid crystal display (LCD), or light-emitting diode (LED), for displaying information to a computer user. Input device 614, which may include physical and/or touchscreen based alphanumeric keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to host computer 624 or to data equipment operated by Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, server 630 might transmit a requested code for an application program through Internet 628, ISP 626, local network 622 and communication interface 618.

The received code may be executed by processor 604 as it is received, and/or stored in storage device 610, or other non-volatile storage for later execution.

5. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors, cause performance of operations comprising:
    training a model based on accesses to a first set of objects to learn one or more access patterns in object metadata, during at least one of a) archival, b) migration, or c) restoration operations, associated with the first set of objects, wherein the one or more access patterns include, a pattern of accessing objects having a first set of one or more metadata attributes subsequent to accessing objects having a second set of one or more metadata attributes that are different than the first set of one or more metadata attributes;
    receiving a request to store a second set of objects that are different than the first set of objects, the second set of objects comprising a first object associated with object metadata having at least the first set of one or more metadata attributes and a second object associated with object metadata having at least the second set of one or more metadata attributes;
    responsive to receiving the request to store the second set of objects that are different than the first set of objects, generating, based on the trained model, a file in which the first object and the second object are stored in at least one of consecutive logical or physical storage locations within the file;
    performing at least one of an a) archival, b) migration, or c) restoration operation on the file that sequentially accesses the first object and the second object that are stored within the file.

2. The one or more non-transitory computer-readable media of claim 1, wherein the pattern of accessing objects having a first set of one or more metadata attributes subsequent to accessing objects having a second set of one or more metadata attributes that are different than the first set of one or more metadata attributes comprises a pattern of restoring objects having the second set of one or more metadata attributes subsequent to restoring objects having the first set of one or more metadata attributes.

3. The one or more non-transitory computer-readable media of claim 1, wherein the pattern of accessing objects having the first set of one or more metadata attributes subsequent to accessing objects having the second set of one or more metadata attributes comprises a pattern of migrating objects having the second attribute subsequent to restoring objects having the first attribute.

4. The one or more non-transitory computer-readable media of claim 1, wherein the first set of one or more metadata attributes identifies a first migration period associated for migrating data objects to a different storage repository and the second set of one or more metadata attributes identifies a second migration period for migrating objects to the different storage repository.

5. The one or more non-transitory computer-readable media of claim 1, wherein training the model comprises generating a set of clusters based on object attributes associated with objects that have been sequentially accessed.

6. The one or more non-transitory computer-readable media of claim 1, wherein the operations further comprise determining that a third object should be stored in a different file than the first object and the second object based on the pattern.

7. The one or more non-transitory computer-readable media of claim 1, wherein the first object and the second object are stored within logically consecutive storage locations within the file; wherein the first object and the second object are not stored at physically consecutive storage locations.

8. The one or more non-transitory computer-readable media of claim 1, wherein the first object and the second object are stored at physically consecutive storage locations.

9. The one or more non-transitory computer-readable media of claim 1, the operations further comprising migrating the file from a first storage location to a second storage location without updating a set of logical pointers that point to storage locations of the first object and the second object within the file.

10. One or more non-transitory computer-readable media storing instructions which, when executed by one or more hardware processors, cause performance of operations comprising:
    receiving, from a particular user, a request to apply a first metadata tag to a first set of one or more objects and a second metadata tag to a second set of one or more objects, wherein the first metadata tag and the second metadata tag indicate that objects similar to the first set of one or more objects should be stored sequentially with objects similar to the second set of one or more objects;
    responsive to receiving the request:
        a) identifying a first object that shares a first set of one or more attributes with the first set of one or more objects and a second object that shares a second set of one or more attributes with the second set of one or more objects; and
        b) associating the first object with the first metadata tag and the second object with the second metadata tag;
    receiving a second request to store a set of objects associated with the particular user, the set of objects comprising the first object that is associated with the first metadata tag and the second object that is associated with the second metadata tag;
    based on the first metadata tag and the second metadata tag, selecting at least one of consecutive logical or physical storage locations within a particular file for storing the first object and the second object to enable sequential access of the first object and the second object;
    performing at least one operation on the file that sequentially accesses the first object and the second object that are stored within the file.

11. The one or more non-transitory computer-readable media of claim 10, wherein the first metadata tag is assigned to a first container that stores objects associated with a first attribute and the second metadata tag is assigned to a second container that stores objects associated with a second attribute.

12. The one or more non-transitory computer-readable media of claim 10, the operations further comprising, determining, based on at least one of the first metadata tag or the second metadata tag, that a third object should not be placed in a same file as the first object and the second object; and storing the third object in a second file.

13. The one or more non-transitory computer-readable media of claim 10, the operations further comprising migrating the file from a first storage location to a second storage location; wherein the file is migrated from the first storage location to the second storage location without updating a set of logical pointers that point to storage locations of the first object and the second object within the file.

14. The one or more non-transitory computer-readable media of claim 10, wherein the at least one of consecutive logical or physical storage locations are logical storage locations within the file.

15. The one or more non-transitory computer-readable media of claim 10, wherein the at least one of consecutive logical or physical storage locations are physical storage locations on a physical storage device.

16. A system comprising:
one or more hardware processors;
one or more non-transitory computer-readable media storing instructions which, when executed by the one or more hardware processors, cause operations comprising:
training a model based on accesses to a first set of objects to learn one or more access patterns in object metadata, during at least one of a) archival, b) migration, or c) restoration operations, associated with the first set of objects, wherein the one or more access patterns include, a pattern of accessing objects having a first set of one or more metadata attributes subsequent to accessing objects having a second set of one or more metadata attributes that are different than the first set of one or more metadata attributes;
receiving a request to store a second set of objects that are different than the first set of objects, the second set of objects comprising a first object associated with object metadata having at least the first set of one or more metadata attributes and a second object associated with object metadata having at least the second set of one or more metadata attributes;
responsive to receiving the request to store the second set of objects that are different than the first set of objects, generating, based on the trained model, a file in which the first object and the second object are stored in at least one of consecutive logical or physical storage locations within the file;
performing at least one of an a) archival, b) migration, or c) restoration operation on the file that sequentially accesses the first object and the second object that are stored within the file.

17. The one or more non-transitory computer-readable media of claim 1,
wherein training the model comprises:
generating a set of clusters of sequential accesses on the first set of objects, wherein a sequential access to a particular subset of objects in the first set of objects is assigned to a particular cluster in the set of clusters as a function of similarity of attributes of the particular subset of objects to attributes of objects accessed by other sequential accesses assigned to the particular cluster, wherein the attributes include an age of each object in the particular subset of objects;
classifying the set of clusters, wherein each cluster in the set of clusters represents a different bin-packing process;
wherein generating the file comprises:
assigning the request to store a second set of objects to the particular cluster in the set of clusters as a function of similarity of the attributes of the second set of objects to the attributes of objects accessed by other sequential accesses assigned to the particular cluster; and
bin-packing the file based on a bin-packing process corresponding to the particular cluster.

18. The one or more non-transitory computer-readable media of claim 1, wherein the first set of one or more metadata attributes include a data retention policy that controls data archiving.

* * * * *